United States Patent [19]

Hamilton et al.

[11] 3,960,535
[45] June 1, 1976

[54] METHOD OF AND APPARATUS FOR BENDING GLASS SHEETS

[75] Inventors: Harold E. Hamilton, Toledo; Waldemar W. Oelke, Rossford, both of Ohio

[73] Assignee: Libbey-Owens-Ford Company, Toledo, Ohio

[22] Filed: Sept. 13, 1974

[21] Appl. No.: 505,550

[52] U.S. Cl. .................................. 65/104; 65/106; 65/273; 65/275
[51] Int. Cl.² .................. C03B 23/02; C03B 27/00
[58] Field of Search ............ 65/106, 107, 104, 273, 65/275

[56] References Cited
UNITED STATES PATENTS
3,594,145    7/1971    Kay .................................. 65/273 X

*Primary Examiner*—Arthur D. Kellogg
*Attorney, Agent, or Firm*—Collins, Oberlin & Darr

[57] ABSTRACT

A method of and apparatus for bending glass sheets between press members provided with opposed shaping rails having complemental surfaces for imparting the desired curvature to a heated glass sheet. Each of the press members is provided with a plurality of burners for directing localized heat to selective portions of the glass sheet during the bending thereof to condition the sheet for subsequent tempering.

11 Claims, 5 Drawing Figures

METHOD OF AND APPARATUS FOR BENDING GLASS SHEETS

BACKGROUND OF THE INVENTION

The present invention relates generally to the production of curved, tempered sheets of glass and, more particularly, to an improved method of and apparatus for bending and treating glass sheets having openings therethrough.

In recent years, curved glass sheets have become increasingly popular for use as glazing closures, particularly in sight openings for vehicles such as automobiles and the like. For such purposes, the glass sheets must be bent to precisely defined curvatures dictated by the configuration and size of the openings and the overall design of the vehicle.

Generally, curved glass sheets intended for use in automobiles are tempered to increase their resistance to damage due to impact and to improve the breaking characteristics of the glass when broken so as to fragment into relatively small harmless particles as opposed to the large, jagged pieces resulting from the breakage of ordinary untempered glass.

One common method of producing curved, tempered sheets of glass is to heat flat sheets of glass to their softening temperature, press the softened sheets to the desired curvature between complemental shaping surfaces and then rapidly chill the bent sheets in a controlled manner to a temperature below the annealing range of glass. Generally, these operations are carried out successively while the sheets of glass are being advanced substantially continuously along a fixed path including a heating area, a bending area and a chilling or tempering area whereby the heat initially imparted to each sheet to bring it to the proper bending temperature can also be utilized in the final heat treating or tempering operation.

Very often the glass sheets produced for movable or slidable glazings, such as automotive doorlights for example, are formed with openings adjacent at least one edge thereof for mounting on associated studs and the like constituting a part of the equipment for moving the lights between the opened and closed positions. One serious problem encountered in the production of such sheets, especially relatively thin glass sheets which are becoming more popular for automotive glazing purposes, is the occurrence of venting from the holes therein during the passage of the sheets through the blasthead when conventionally processed as described above. The reason for this venting is believed due to the relatively small areas of glass between the openings formed in the sheet and the edge thereof, which are not of sufficient mass to maintain the necessary heat or temperature required for proper tempering.

SUMMARY OF THE INVENTION

Accordingly, it is a primary object of the present invention to direct heat to certain selective portions only of a glass sheet during the bending phase thereof to maintain such portions at the necessary temperature required for proper tempering.

Another object of the present invention is to provide an improved method of and apparatus for bending heated sheets of glass between opposed press members to desired curvatures and directing localized heat to certain selective portions thereof while the sheet is supported on a shaping surface of one of the opposed press members.

Generally speaking, the present invention is characterized by the provision of a pair of reciprocal, opposed bending presses for imparting the desired curvature to a heated glass sheet, at least one of such presses being provided with a plurality of gas fired burners for directing localized heat to selective portions only of the glass sheet being bent.

The foregoing and other objects, advantages, and characterizing features of the present invention will become clearly apparent from the ensuing detailed description of an illustrative embodiment thereof, taken together with the accompanying drawings wherein like reference numerals denote like parts throughout the various views.

DESCRIPTION OF THE PREFERRED EMBODIMENT

Figure 1:
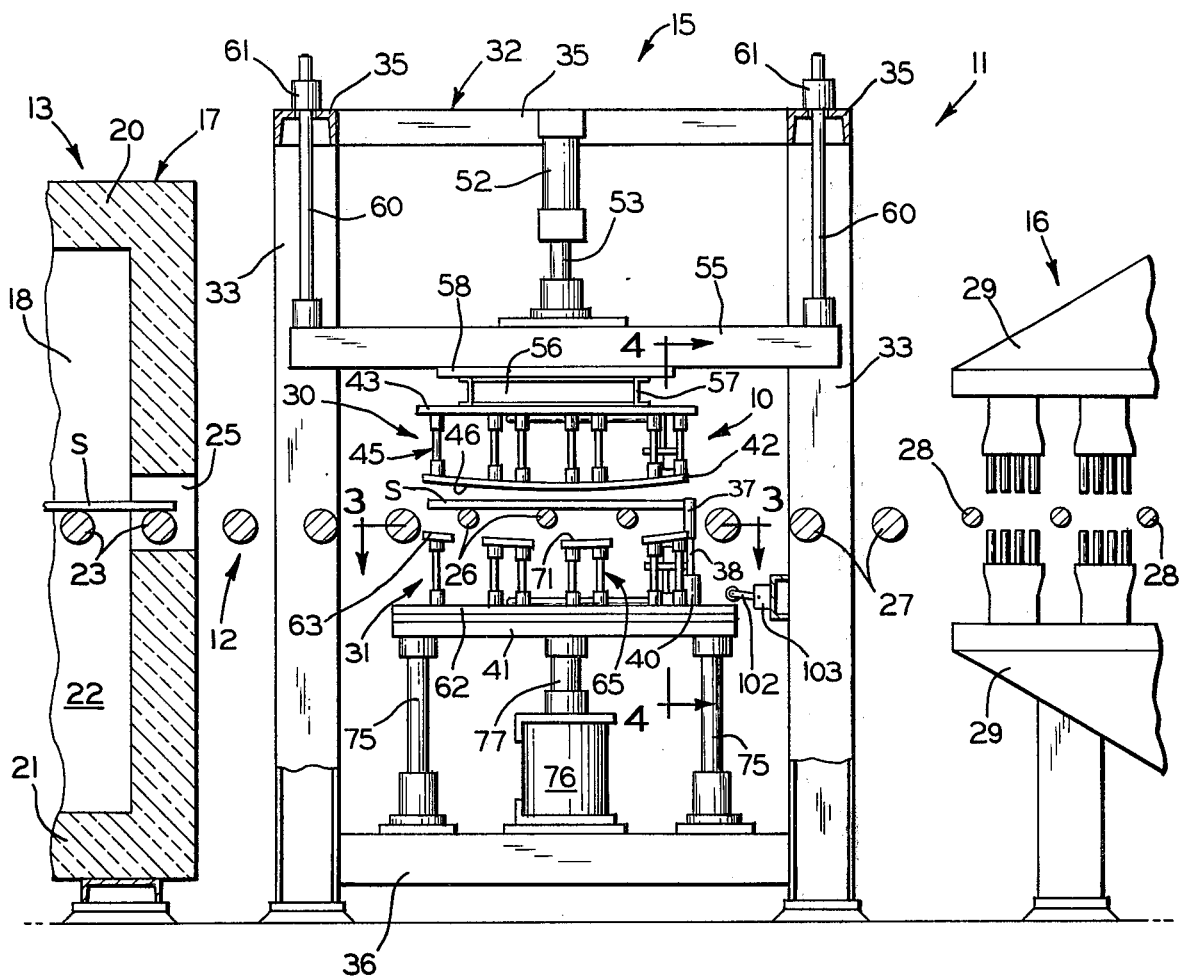
FIG. 1 is a side elevational view of a bending and tempering apparatus incorporating the novel features of the present invention.

Referring now in detail to the illustrative embodiment depicted in the accompanying drawings, there is shown in FIG. 1 a bending apparatus, generally designated 10, constructed in accordance with this invention and incorporated in a glass sheet bending and tempering apparatus, comprehensively designated 11, particularly adapted for use in the production of bent tempered glass sheets by a continuous process in which the sheets to be treated are moved successively along a predetermined path through a heating area, a bending area and a tempering area, these areas being contiguous so that a sheet passes immediately from one area to the next succeeding area. To this end, apparatus 11 includes a conveyor system 12 adapted to support a plurality of sheets S in a horizontal plane for movement, one by one, along a predetermined path through a heating section 13, a bending section 15 in which apparatus 10 is mounted, and a tempering section 16, the sections 13, 15 and 16 being disposed end-to-end along said path.

In the illustrated embodiment, the heating section 13 comprises a tunnel-type furnace 17 having a heating chamber 18 defined by a top wall 20, a bottom wall 21, and opposite side walls 22, all formed of a suitable refractory material. The chamber 18 can be heated in any desired manner by suitable heating means, such as gas fired burners or electrical resistance elements for example (not shown) located in the top and side walls of the furnace 17. The sheets S are advanced through the heating chamber 18 on a series of conveyor rolls 23, which form a part of the conveyor system 12, and extend from the entrance end (not shown) of the furnace to an oppositely disposed exit end. The sheets S are heated to substantially the softening point of the glass during their passage through the chamber 18 and, upon emerging from an opening 25 in the exit end of the furnace, are received on a second series of conveyor rolls 26, also a part of the conveyor system 12, which move the sheets into and within the bending section 15 between a pair of press members, hereinafter more fully described, constituting the bending apparatus 10 of this invention and which impart the desired curvature to the sheets S.

After bending, the sheets S are advanced along the path and are transferred from the conveyor rolls 26 onto a third set of conveyor rolls 27, forming a part of the conveyor system 12 and which move the bent sheets S to the tempering section 16 and onto a fourth series of conveyor rolls 28. The bent sheets are advanced on the rolls 28 through the tempering section 16 wherein their temperature is rapidly reduced to produce the proper temper in the glass. In the illustrated embodiment, the tempering section 16 includes cooling means comprising upper and lower blastheads 29 disposed above and below the path of movement of the glass sheets and are provided with a series of tubes operable to direct opposed streams of cooling fluid, such as air or the like, toward and against the opposite surfaces of the sheets S moving along such path.

In accordance with this invention, the bending apparatus 10 comprises an upper male press member 30 and a lower female press member 31 having opposed complemental shaping surfaces conforming to the desired curvature of the sheet to be bent. The press members 30 and 31 are mounted for relative movement toward and away from each other on a structural frame 32, which includes a framework of vertically disposed columns 33 and horizontally extending beams 35 interconnected and tied together to form a rigid, box-like structure. A base member 36 extends between the upright columns 33 for supporting the female press member 31 and associated parts. The male press member 30 is mounted above the conveyor rolls 26 for vertical reciprocal movement relative to frame 32 while the female press member 31 is located below the conveyor rolls 26 and mounted for vertical reciprocal movement toward and away from the male press member 30.

A pair of laterally spaced locator stops 37 (only one of which is shown in FIG. 1) is positioned in the path of movement of the advancing glass sheets to interrupt movement thereof and accurately position the same in the desired location relative to the press members 30 and 31. Each stop 37 is secured to the distal end of a piston rod 38 of a fluid actuating cylinder 40 mounted on a carriage 41. The cylinders 40 are operative to raise and lower the stops 37 between an upper position above conveyor rolls 26 in the path of movement of the glass sheet S and a lower position therebeneath.

Figure 4:
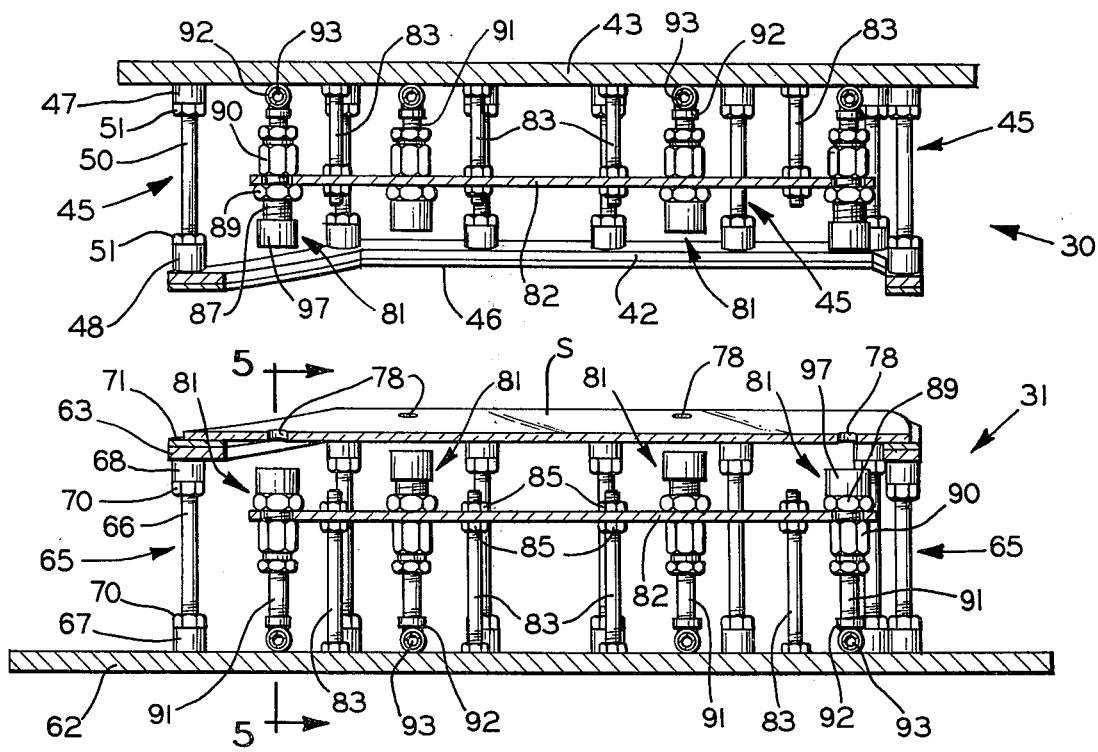
FIG. 4 is a vertical sectional view, on an enlarged scale, taken along the line 4—4 of FIG. 1.

As best shown in FIG. 4, the male press member 30 is of outline or ring-type construction and comprises a continuous shaping rail 42 connected to a base member 43 by a plurality of mounting members, generally designated 45, hereinafter more fully described. The shaping rail 42 conforms in outline to the glass sheets S to be bent and is provided with a downwardly directed, generally convex shaping surface 46 on the lower surface thereof to impart the desired curvature to the sheet. However, the particular outline of the shaping rail 42, as well as the specific curvature of the shaping surface 46, is dictated by the desired shape of the glass sheet being bent and can vary widely, as desired.

Each of the mounting members 45 comprises an upper, internally threaded boss 47 and a lower, internally threaded boss 48 welded or otherwise fixedly secured to the base member 43 and rail 42, respectively, and a rod 50 threaded at its opposite ends into the bosses 47 and 48. Lock nuts 51 are provided on the rod 50 to insure proper retention thereof in the bosses 47 and 48. The threaded rods permit adjustment of the shaping rail 42 vertically toward and away from its associated base member 43.

The means for supporting the male press member 30 on frame 32 includes at least one actuating cylinder 52 (FIG. 1) mounted on one of the upper horizontal beams 35 and having a suitable reciprocable piston (not shown) provided with a piston rod 53 connected at its outer end to a vertically reciprocal platen frame 55. The base member 43 of the male press member 30 is connected to the platen frame 55 for movement therewith by means of interconnected structural members 56 and 57 and a support plate 58 extending transversely of the platen frame 55. A plurality of guide posts 60 are connected at their lower ends to the four corners of platen frame 55, respectively, and extend upwardly through suitable bushings 61 mounted on upper horizontal beams 35 for sliding movement relative thereto to properly guide platen frame 55 during its vertical reciprocal movement.

As shown in FIG. 4, the female press member 31 is also of outline or ring-type construction and comprises a base member 62 secured to the carriage 41 and a shaping rail 63 connected to the base member 62 in spaced relation thereto via a series of mounting members, generally indicated by the numeral 65. Each of the mounting members 65 includes an elongated rod 66 threadably received at its opposite ends in opposed, internally threaded bosses 67 and 68 rigidly secured to the base member 62 and shaping rail 63, respectively. Threading the rods 66 into and out of their respective bosses 67 and 68 effects vertical adjustment of the shaping rail 63 relative to its associated base member 62. Suitable lock nuts 70 are provided on each rod 66 adjacent bosses 67 and 68 to secure the same in the selected adjusted position.

The shaping rail 63 conforms in outline to the glass sheets S to be bent and is provided on its upper face with a generally concave shaping surface 71 complementary to the male press member shaping surface 46 in opposed relation thereto. To permit displacement of the female shaping rail 63 above the level of the conveyor rolls 26 for lifting the glass sheets thereabove into pressing engagement with the male shaping rail 42, the female rail 63 is formed of a plurality of segments (FIG. 3) including end bars 72 extending parallel to the conveyor rolls 26 and side bars 73 extending generally transversely to the conveyor rolls 26 and spaced apart from each other a sufficient distance to pass between adjacent rolls 26. As compared to rolls 23 and 27, the diameter of rolls 26 are formed relatively small to provide maximum clearance therebetween for the passage of the segments therethrough.

The carriage 41 is supported by a pair of guide members 75 (FIG. 1) and vertically movable by a fluid actuator 76 mounted on base member 36 and having a suitable piston rod 77 for raising and lowering the female press member 31 between its lower position beneath conveyor rolls 26 and its upper position thereabove for lifting a heated glass sheet S from the conveyor rolls 26 and pressing the same against the male press member 30 between the complemental shaping surfaces 46 and 71, thus forming the glass sheet into the desired curvature. After bending, piston rod 77 is retracted to lower the female press member 31 below conveyor rolls 26, depositing the bent sheet thereon for advancement into the tempering section.

It should be appreciated that in order to obtain a proper temper in a glass sheet possessing the requisite strain to meet particle size requirements when broken, the temperature thereof must be above at least a predetermined minimum, say about 1130°–1165° F. for example, when subjected to rapid chilling or quenching to impart the desired internal stresses to the sheet. If below this critical range, the glass surfaces are not sufficiently conditioned to resist the thermal shock of rapid chilling and have a tendency to vent, i.e., form small cracks, when quickly chilled. Thus, it is important that the heated glass sheet have a temperature throughout above such critical range for tempering purposes. Generally, enough residual heat remains in bent glass sheets of conventional and uniform thicknesses from that initially imparted thereto for bending, even though heat losses occur during such bending, to obtain a proper temper.

Figure 2:
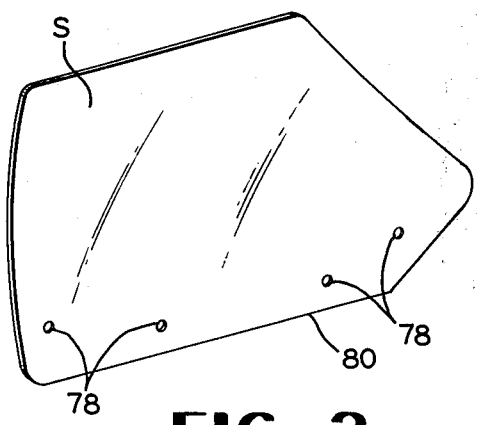
FIG. 2 is a perspective view of a typical bent glass sheet formed by the apparatus and method of this invention.

However, the production of glazing closures having openings therein, such as that depicted in FIG. 2, by the conventional method heretofore described, presents problems. FIG. 2 illustrates a typical finished glazing closure S having a compound or complex bend, i.e., a bend along both major axes, and a series of spaced openings 78 along the lower edge 80 which has an upwardly directed inclined portion at the righthand end thereof as viewed in FIG. 2. The openings 78 receive studs or other mounting elements forming a part of the closure actuating means. Edge 80 of the sheet S forms the bottom edge of the finished closure when properly mounted in the vehicle body and the openings 78 necessarily must be located in close proximity to edge 80 so as to remain concealed when the closure is raised to its closed position.

One problem encountered in producing the exemplary closure illustrated in FIG. 2 by the conventional manner heretofore described, especially closures formed of thin glass sheets on the order of 0.156 inch in thickness for example, is the occurrence of venting emanating from the openings, i.e., the generation of small cracks leading from the circular walls defining such openings. This is believed due to the relatively small mass of material between such openings and the edge of the glass sheet, which small mass, even though initially heated along with the remainder of the sheet to the point of softening for the bending phase, cools rapidly during bending and does not retain sufficient heat to withstand the shock of rapid chilling subsequently encountered in the tempering section.

According to the present invention, therefore, means are provided on the press members for applying localized heat to selective portions only of the glass sheet, i.e., only to the regions of the openings therein, while positioned on the female press member during the bending cycle. To this end, a plurality of heating elements in the form of gas fired burners, generally designated 81, are mounted on the press members 30 and 31 to direct heat against the glass sheet S in the regions of the openings only. Since the burners 81 of the male and female press members are identical in construction and function in the same manner, it is believed that a detailed description of the burners on the female press member 31 only will suffice, the same reference characters being applied to similar parts on the male press member.

Figure 3:
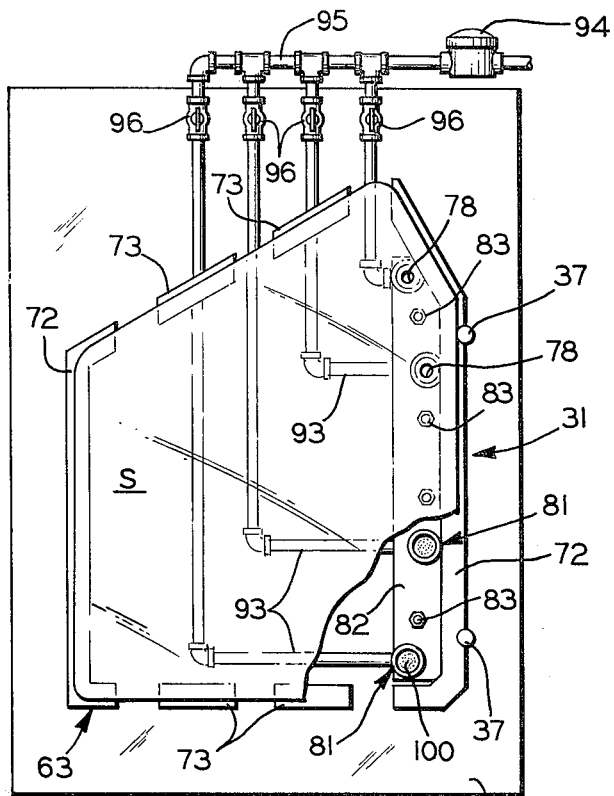
FIG. 3 is a top plan view, on an enlarged scale, of the female ring-type press member of FIG. 1, looking in the direction of the arrows 3—3 of FIG. 1, and which is constructed in accordance with the principles of this invention.

Referring now to FIGS. 3 and 4, a plurality of gas fired burners 81 are mounted on female press member 31 in general vertical alignment with the openings 78 of glass sheet S. Each burner 81 is removably secured to an elongated plate 82 interposed between the base member 62 and shaping rail 63 in spaced relation therebetween and located adjacent one end of the female press member 31 as best shown in FIG. 3. Plate 82 is secured in place by means of a plurality of threaded studs 83 suitably secured at their lower ends to base member 62 and insertable through openings formed in the plate 82 and secured thereto by a pair of lock nuts 85 threaded on each stud 83 on the opposite sides of plate 82.

Each gas fired burner 81 comprises a cup shaped head 86 and a threaded shank 87 insertable through an opening 88 in plate 82 and threaded into an enlarged socket 90 formed on the upper end of a nozzle 91. The threaded connection between the burner head 86 and nozzle socket 90 affords axial adjustment of the burner to vary the length thereof for spacing head 86 at an optimum distance from the glass sheet S. A lock nut 89 is threaded onto shank 87 in bearing engagement against plate 82 to secure the burner in the selective adjusted position. Each nozzle 91 is tapped, by means of a coupling 92, into a conduit 93 connected to a common gas supply line 95. Each conduit 93 is provided with a control valve 96 to individually vary the pressure setting thereof and thereby the amount of gas admitted to its associated burner and the intensity of the heat generated thereby. A control valve 94 provided in supply line 95 is actuated by an electrical control system (not shown) for controlling the pressure of the gas flowing therethrough between a low pressure or "pilot" setting and a high pressure setting, as determined by the respective pressure settings of valves 96.

Figure 5:
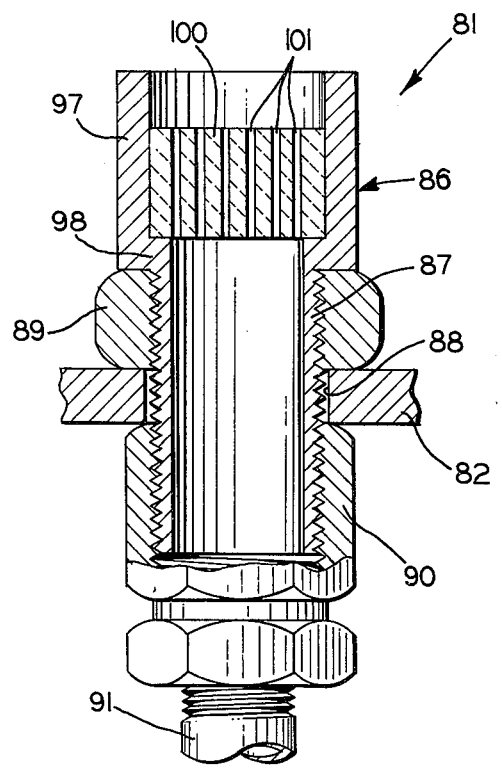
FIG. 5 is a vertical sectional view, on an enlarged scale, taken along the line 5—5 of FIG. 4, showing details of one of the burner elements.

As best shown in FIG. 5, each burner head 86 includes a cylindrical wall portion 97 and an end wall portion 98 having a central opening therein communicating with the interior of shank 87. The end wall portion 98 serves as a seat for a closure plate 100 forming the bottom wall of head 86. Plate 100 is formed of a suitable refractory material and is provided with a plurality of closely spaced, parallel orifices or fine passages 101 through which the gas flows for combustion.

The burners 81 correspond in number to the number of openings 78 formed in the sheet S and are located in axial registry therewith in a desired spaced relation therefrom. The diameters of the burner heads 86 can vary in accordance with the diameters of their associated openings 78 to apply the necessary heat thereto.

While both the male and female press members 30 and 31 of the illustrated embodiment are equipped with burners, it should be understood that the principles of this invention contemplate the provision of burners on only one of such members, and preferably the female press member 31, if desired. Where only the female press member 31 is provided with burners, the male press member may consist of a conventional male mold having a substantially continuous shaping surface, as is well known in the art, in lieu of a shaping rail.

In a typical operational cycle wherein only the female press member 31 is provided with burners 81, glass sheets S are loaded one at a time onto the conveyor rolls 23 at the entrance end (not shown) of the furnace 17 for movement through the heating chamber 18 wherein each sheet S is heated to substantially its softening point or bending temperature. The heated sheet S passes through the opening 25 and is transferred onto conveyor rolls 26 for movement into bending station 15. As the sheet enters the bending section 15, a photocell or other suitable detection device (not shown) initiates activation of a timer (also not shown) controlling operation of the bending cycle. The timing of this control is such that when the leading edge of the glass sheet S engages the stops 37, cylinder 76 is actuated to raise the female press member 31 upwardly to remove the sheet from conveyor rolls 26 and press the same against the male press member 30 to shape sheet S into the desired curvature. During the upstroke of female press member 31, cylinders 40 are actuated to retract the locator stops 37 to permit advancement of the bent sheet when subsequently returned to the conveyor rolls 26.

At the beginning of the upward movement of female press member 31, it engages the actuating lever 102 of a limit switch 103 suitably supported on the frame 32 to activate a timer controlling the establishment, duration, and interruption of the high pressure settings of the respective burners. As the female press member 31 begins to rise, the pressure of the combustion gases delivered to the burners 81 is increased from the lower pressure "pilot" setting to a high pressure setting for a predetermined period of time, preferably until about the time the glass sheet engages the male press member 30. The heat generated by burners 81 is directed to the surface of the sheet S only in the regions of the openings 78 therein to superheat such regions and maintain them above the minimal temperature necessary for proper tempering. This high pressure setting is interrupted during the actual bending process and then re-established immediately after the female press member 31 begins to descend. The high pressure setting of the burners 81 is maintained until the female press member is lowered beneath the conveyor rolls 26, which transfer the bent glass sheet S out of the bending section 15 onto exit conveyor rolls 27. The advancing bent sheet S is then transferred from conveyor rolls 27 onto rolls 28 for conveyance between the opposed tubes of blastheads 29 at a speed promoting a proper rate of cooling to obtain a quality temper in the bent sheet. The sheet S, including those portions about the openings 78 and between the latter and edge 80, possess the necessary temperature required for tempering.

The preferred process according to this invention has been tested in a continuous production operation for successively bending glass sheets having openings therein to the desired curvature and satisfactorily tempering the same to meet particle size requirements when broken. The glass sheets formed by this process were of a generally polygonal shape in plan and intended for use as a movable glazing closure in an automotive rear door panel. Each of the sheets had a thickness of approximately 0.156 inch, was approximately 32 inches in length along the longest dimension thereof and about 22 inches wide across its widest transverse dimension. The glass sheet had five ½ inch diameter openings and a single ⅞ inch diameter opening spaced approximately one-half of an inch away from that edge intended to be the bottom edge when mounted in an automotive rear door panel. Accordingly, the female press member was provided with five burners of equal diameter located in substantial vertical alignment with the ½ inch openings and a sixth burner of slightly larger diameter in registry with the ⅞ opening, respectively. The upper ends of the burners were spaced about 1 inch from the glass surface when resting on the female shaping rail. The low pressure or "pilot" setting for each burner was approximately 1.5 inches water column and the high pressure setting as adjusted to about 25 inches water column. The high pressure setting began at the initiation of the upstroke of the female press member 31 and was held for approximately 0.8 second at which time the glass sheet engaged the male press member. The high pressure setting was interrupted during the bending dwell for about 1.5 seconds and then re-established as the female press member began its descent after bending. This high pressure setting was maintained until the bent sheet was returned to the conveyor for advancement toward the tempering section, which was about 2.5 seconds.

The above process has proven satisfactory in maintaining the bent glass sheets sufficiently heated throughout to obtain a quality temper therein. A greatly improved survival rate through the tempering section was realized as compared to the survival rate of similar glass sheets having comparable dimensions processed in the conventional manner without benefit of localized heating.

While the high pressure setting was described above as being interrupted during the press dwell, i.e., actual pressing of the glass sheet between the male and female pressing members, it should be appreciated that the high pressure setting can be maintained during such press dwell and the duration, as well as the intensity of such setting, may vary, as desired. Moreover, the individual settings of the various burners can vary and the burners of both presses may be fired, if warranted. While it was convenient to describe this invention in connection with the production of a glazing closure formed of a glass sheet having a series of openings therethrough, it should be understood that this invention is not limited thereto, but has utility in any glass production operation where it is desired to produce localized variations of heating during bending for tempering or other purposes.

From the foregoing, it is apparent that the objects of this invention have been fully accomplished. An improved bending apparatus is provided for imparting desired curvatures to heated glass sheets while applying localized heat to selective portions thereof in a manner conditioning such sheets for subsequent tempering. By confining the heat to such selective portions, and thereby assure the proper retention of heat therein, the possibility of venting otherwise generated in such troublesome portions during subsequent tempering, is minimized. The heat directed to these selective portions or regions can be readily regulated as to intensity and duration and can vary from burner to burner as dictated by the ability of these portions to retain heat, which can be influenced for example by the diameter of the openings formed therein and their respective spacings from the adjacent sheet edges.

It is to be understood that the form of the invention herewith shown and described is to be taken as an illustrative embodiment of the same, and that various changes in the shape, size and arrangement of parts, as well as various procedural changes, may be resorted to without departing from the spirit of the invention.

We claim:

1. A method of bending and heat treating a sheet of glass comprising: heating a sheet of glass having at least one opening therethrough to the softening point of the glass, supporting the heated sheet on a shaping surface of a press member, moving said press member toward a complemental shaping surface of a second press member during a bending cycle to press said sheet therebetween and impart the desired curvature to said sheet, and applying supplemental heat to at least one surface of said sheet in the region of said opening only while said sheet is supported on said shaping surface during said bending cycle to condition said sheet for subsequent tempering.

2. A method according to claim 1, wherein said heat is applied to said sheet selective portions during movement of said sheet toward and away from said second press member.

3. A method according to claim 1, including varying the intensity of said heat during various stages of said bending cycle.

4. A method according to claim 1, including normally maintaining the intensity of said heat at a relative low intensity, and increasing the intensity of said heat during the movement of said sheet toward and away from said second press member.

5. In apparatus for bending a heat softened glass sheet having at least one opening therethrough by pressing the same between opposed complemental shaping surfaces formed on opposed press members at least one of which is movable toward and away from the other during the bending cycle and includes a base member and a shaping rail mounted on said base member; the improvement in which means are mounted on said one press member for applying localized heat to at least one opposite surface of said sheet in the region of said opening while supported on said shaping surface of said one press member during said bending cycle.

6. Apparatus for bending glass sheets according to claim 5, including means for varying the intensity of said heat during said bending cycle.

7. Apparatus for bending glass sheets according to claim 5, wherein said sheet is formed with a plurality of laterally spaced openings therethrough spaced inwardly of at least one marginal edge of said sheet and said heating means comprises a plurality of laterally spaced burners in general registry with said openings of said sheet.

8. Apparatus for bending glass sheets according to claim 7, including means for individually controlling said burners to vary the intensity of the heat generated thereby.

9. Apparatus for bending glass sheets according to claim 7, including means for mounting said burners on said one press member, said mounting means comprising a plate connected to said base member and interposed between said base member and said shaping rail, and means removably securing said burners to said plate.

10. In apparatus for bending heat softened glass sheets by pressing the same between opposed complemental shaping surfaces formed on opposed press members at least one of which is movable toward and away from the other during the bending cycle and includes a base member and a shaping rail mounted on said base member: the improvement in which means are mounted on said one press member for applying localized heat to selective portions only of at least one opposite surface of said sheet while supported on said shaping surface of the said one press member, said selective portions of said glass sheet including openings, respectively, extending through said sheet, said burners being mounted on said one press member in substantial axial alignment with said openings, respectively.

11. A method according to claim 1, wherein said sheet of glass is formed with a plurality of discreet openings therethrough, including the step of applying supplemental heat to the immediate zone of said openings while said sheet is supported on said shaping surface during said bending cycle.

* * * * *